June 16, 1942.　　　J. P. MAYNARD　　　2,286,970
MACHINE FOR SHARPENING LAWN MOWERS
Filed June 6, 1939　　　3 Sheets-Sheet 1

Inventor:
Joel P. Maynard
By
Attorneys.

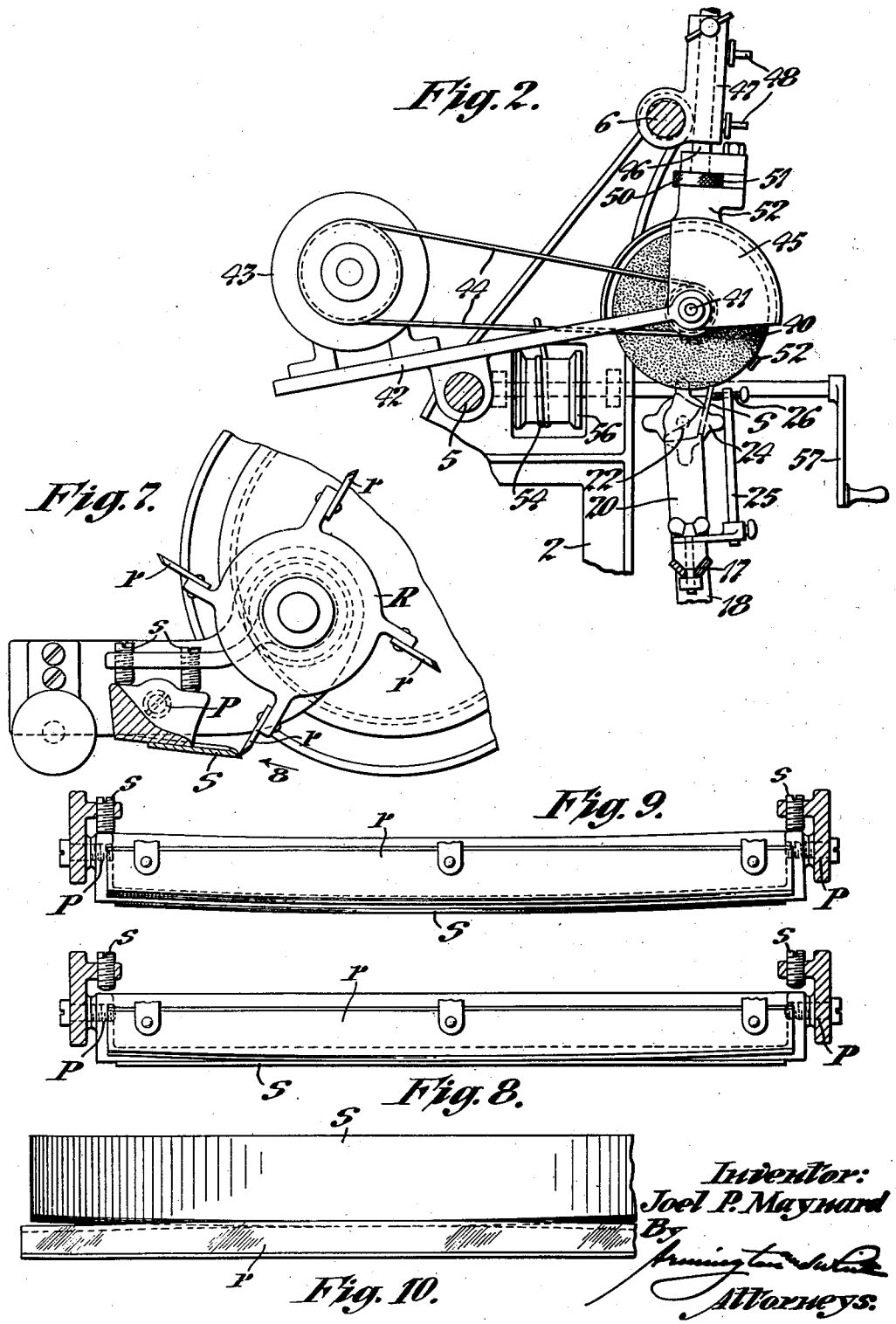

June 16, 1942.  J. P. MAYNARD  2,286,970
MACHINE FOR SHARPENING LAWN MOWERS
Filed June 6, 1939  3 Sheets-Sheet 3
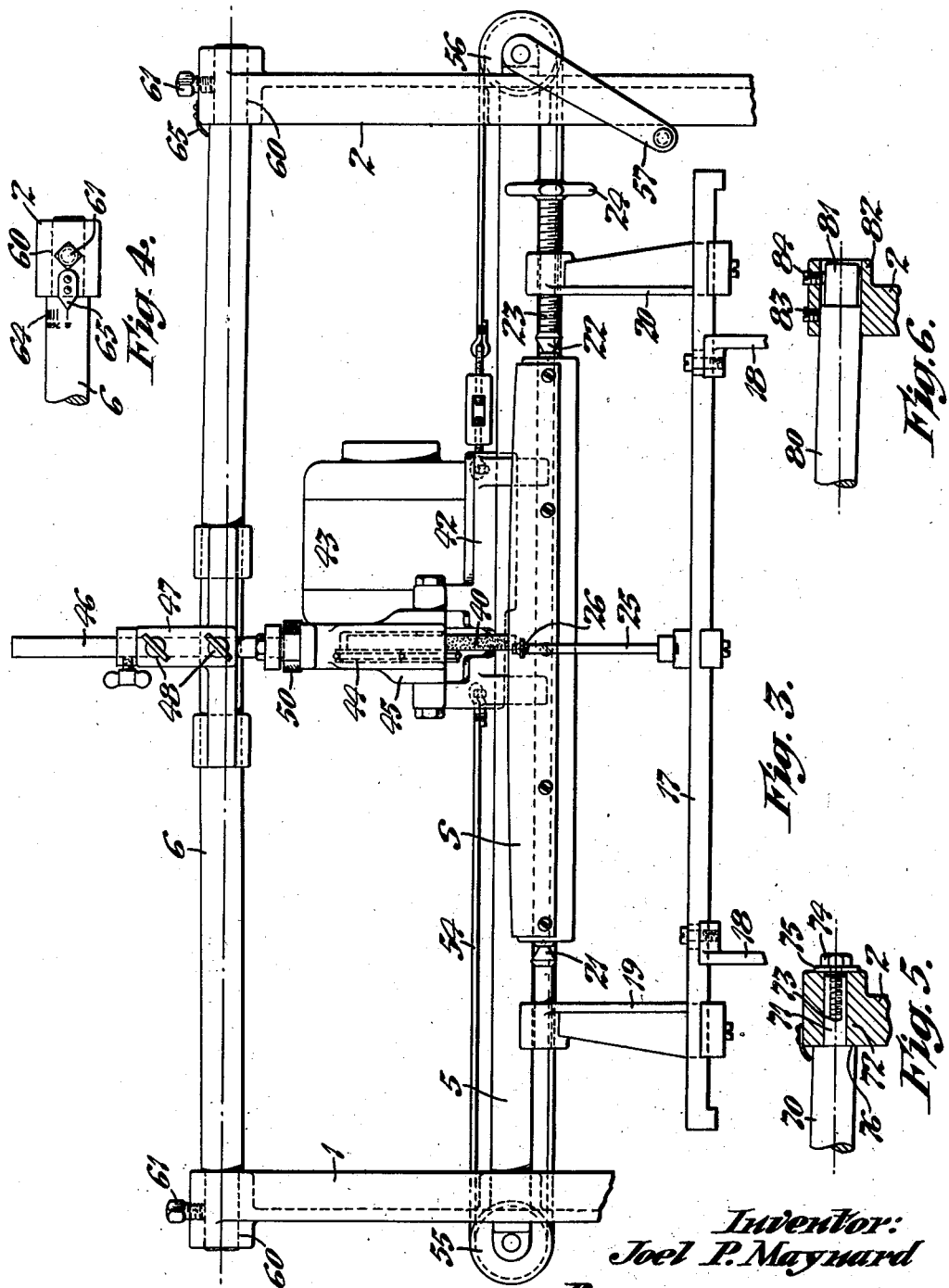
Inventor:
Joel P. Maynard
By
Attorneys.

Patented June 16, 1942

2,286,970

UNITED STATES PATENT OFFICE 2,286,970

MACHINE FOR SHARPENING LAWN MOWERS

Joel P. Maynard, Pawtucket, R. I., assignor to The Graham Mfg. Co., Inc., a corporation of Rhode Island Application June 6, 1939, Serial No. 277,648

7 Claims. (Cl. 51—48)

The present invention relates to a method of sharpening the rotary blades on the reel of a lawn-mower to adapt them to align with the stationary blade and to improvements in lawn-mower grinding machines of the type illustrated and described in United States Letters Patent No. 2,142,669, issued to Purdom Carpenter January 3, 1939.

One of the objects of the present invention is to provide a method of grinding the rotary blades on the reel of a lawn-mower to cause them to align with the stationary blade throughout their length when assembled in the mower.

Another object of the invention is to provide outwardly-bowed arcuate cutting edges on the rotary blades of a lawn-mower to compensate for the concave arch in the stationary blade caused by clamping it in position on the mower.

Another object of the invention is to provide in a machine for grinding cutting edges on the blades of a lawn-mower, a track for guiding the grinding tool through an arcuate path as it traverses the blade being ground.

Another object of the invention is to provide a machine of the type indicated wherein the guiding track is adjustable to vary the radius of the arcuate path of the grinding tool.

Still another object of the invention is to provide a machine of the type indicated adapted to accurately grind arcuate cutting edges of predetermined radius on the lawn-mower blades and of simple construction to adapt it for economical manufacture.

Further objects of the invention are set forth in the following specification which describes the method of the present invention and a preferred type of machine for grinding the cutting edges on the lawn-mower blades in accordance with the improved method, by way of example, as illustrated by the accompanying drawings. In the drawings:

Fig. 2 is a partial view of the machine similar to Fig. 1 showing a stationary bed-blade mounted in position to be traversed by the grinding tool;

Fig. 3 is a partial front view of the machine showing the arcuate guiding track for the grinding tool and the arcuate cutting edge formed on the blade by the grinding tool as it traverses the blade;

Fig. 4 is a detailed plan view of the end of the guiding track showing the indicating means for adapting the track to be accurately adjusted to move the grinding tool through an arcuate path of a predetermined radius;

Fig. 5 is a detailed sectional view of the end of a guiding track of modified construction adapted to be arched by clamping it in position in the machine frame;

Fig. 6 is a sectional view similar to Fig. 5 showing another modified form of guiding track;

Fig. 7 is a part sectional view of a lawn-mower showing the cooperative relationship of its stationary and rotary blades and illustrating the arch in the stationary blade;

Fig. 8 is a view of the cooperative lawn-mower blades taken in the direction indicated by the arrow 8 in Fig. 7 showing the arcuate cutting edge on the rotary blade and its relationship to the stationary blade before the set-screws are tightened to clamp the latter in the mower;

Fig. 9 is a view similar to Fig. 8 showing the stationary blade clamped in position in the mower and arched to align its cutting edge with the arcuate cutting edge on the rotary blade throughout its length;

Fig. 10 is a plan view of the blades shown in the relationship illustrated in Fig. 7;

Figures 1, 11, 12:
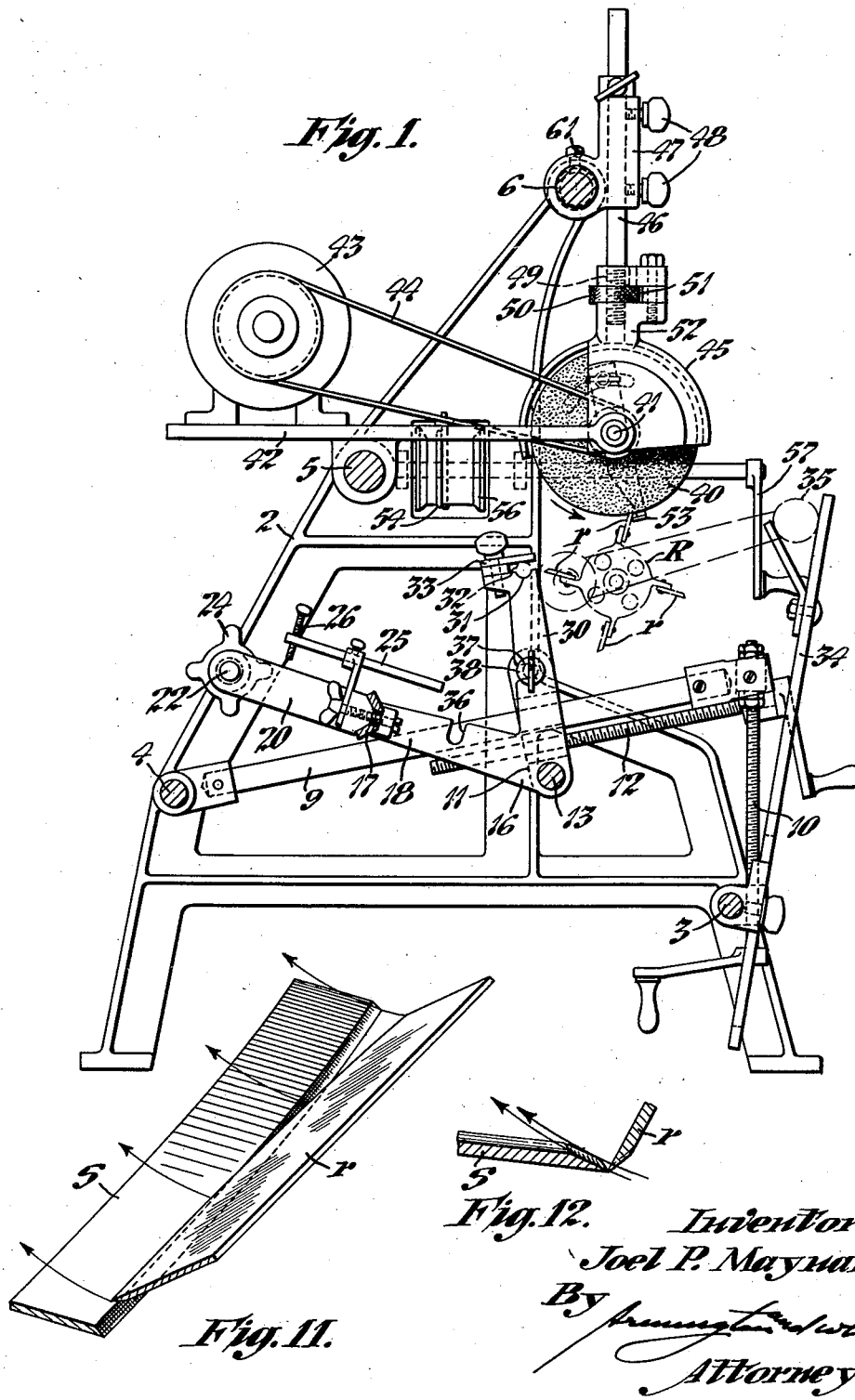
Fig. 1 is a transverse sectional view of a grinding machine showing the reel of a lawn-mower mounted therein to position its blades to be relatively traversed by the grinding tool.
Fig. 11 is a perspective view of the blades illustrating their cooperative relationship and the path of movement of the rotary blade.
Fig. 12 is an enlarged detailed sectional view through the blades shown with arrows indicating the alignment of the cutting edges of the blades at their central portions and at their ends.

Substantially all lawn-mowers comprise a reel R having rotary blades $r$ and a stationary blade S for cooperation with the rotary blades as illustrated in Fig. 7 of the drawings. Usually the rotary blades spiral about the axis of the reel but for the purpose of simplification the rotary blades are illustrated in the present drawings as parallel to the axis of the reel. The stationary blade S is mounted in the mower by means of pins or screws P at the ends of the blade which extend through the side frames of the mower. The stationary blade S is adjusted with respect to the reel blades $r$ and rigidly clamped in position by pairs of set-screws $s$ at each end of the mower which engage the blade at opposite sides of the pins $p$, see Figs. 7 and 8. By tightening one or the other of the set-screws $s$ of each pair the stationary blade S may be rocked about the pins $p$ as pivots and by tightening all the set-screws the stationary blade is clamped in adjusted position.

When lawn-mowers are reconditioned the stationary blade S and the rotary blades r on the reel R are ground separately and then assembled in cooperative relationship in the mower. The blades S or r are sometimes ground by off-hand grinding, that is to say, by merely holding the blade in the hands and traversing it across a rotary grinding wheel. With such a method of grinding the blades when assembled in the mower do not accurately align throughout their length. A more approved method is to mount the stationary blade S or reel R in fixtures on a grinding machine bed and traverse a rotary grinding wheel relatively of the blade being ground. By such a method accurate cutting edges may be ground on the blades. However, when the blades so ground are mounted in the mower the cutting edges do not align throughout their length. If the blades are adjusted in the mower with sufficient clearance to permit free rotation of the reel the blades do not cut at their central portions. If the blades are set close enough to cut at their central portions the end portions bind and dull the cutting edges. The binding of the blades also interferes with the free rotation of the reel R. Such failure of the blades S and r to aline has always been considered to be due to inaccurate grinding or reasons not understood and it has been the practice to lap in the stationary and rotary blades with a grinding compound after the blades have been assembled in the mower.

The present invention resides in part in the discovery that the failure of the cutting edges of the rotary blades r and stationary blade S to align when assembled in the mower is not due to inaccurate grinding but instead results from the arching of the stationary blade caused by tightening the set-screws s to clamp the blade in the mower. The forces applied by the set-screws s at one side of the stationary blade S inwardly of its supported ends causes the blade to arch or bow outwardly away from the cutting edges of the rotary blades r. The degree or magnitude of misalignment due to arching of the stationary blade S varies with the length of the blades and with blades as made by different manufacturers. The arching of the stationary blade S, however, is constant for a particular length of blade made by a particular manufacturer and due to the fact that most lawn-mowers are made by a few leading manufacturers the arch to be expected in any blade can be determined empirically and listed. For example, a sixteen-inch blade made by a particular manufacturer will arch .008 of an inch out of line when clamped in a mower with the usual pressure applied to the set-screws. The degree of arching, however, may be varied from one to two thousandths of an inch by the pressure applied by the set-screws to clamp the blade in position.

The improved method of the present invention resides in grinding arcuate cutting edges on the rotary blades r on the reel R of the mower to compensate for the arching of the stationary blade S. The reel R is mounted at its axis of rotation in a suitable fixture on a grinding machine, or the mower with its reel rotatably mounted thereon may be mounted on the bed of the grinding machine and the cutting edge of the rotary blades are traversed by a grinding wheel. The blade and tool, however, are not traversed in a straight line but instead are relatively traversed in an arcuate path to grind a cutting edge on the reel blade r which bows outwardly between its ends. The radius of the arcuate path of traverse is varied with different lengths of blades and blades as made by different manufacturers as determined empirically from the degree of arch occurring in the stationary blades S of similar mowers. The reel R and stationary blade S are then assembled in cooperative relationship in the mower and the stationary blade adjusted with respect to the reel blades r and clamped in place by tightening the set-screws s. By tightening or loosening the set-screws s the arch in the stationary blade S may be varied within a limited range to provide a minute adjustment. It has been found from experience in grinding the blades of a great number of mowers that when the reel blades r are ground with arcuate cutting edges of predetermined radius for a particular length and type of blade and assembled in the manner as explained above the cutting edges of the rotary and stationary blades accurately align throughout their length. Thus, with applicant's method the step of lapping-in the blades with a grinding compound is unnecessary.

The stationary blade S is usually ground on the same grinding machine used to grind the reel blades r and it is therefore inconvenient to adjust the machine to grind arcuate edges on the reel blades and straight edges on the stationary blade. It has been found that an arcuate edge of the same radius as the arcuate edges on the reel blades may also be ground on the stationary blade and that the blades will align throughout their length when assembled in the mower. For analogy, the reel R with arcuate cutting edges on its blades r may be likened in shape to a barrel and the arched stationary blade S having an arcuate edge may be likened to a barrel stave when clamped in position in the mower. If the stave of a barrel is positioned lengthwise of the barrel its edge will conform to the contour of the barrel with the outwardly-bowed central portion projecting forwardly to conform to the curvature of the barrel below a plane extending between the ends of the stave. Thus, an arched stationary blade having an outwardly bowing cutting edge will conform to the contour of the arcuate cutting edges on the reel R in the same manner that the edge of a barrel stave will conform to the contour of a barrel. Consequently, applicant has determined that with arcuate cutting edges formed on the rotary blades r of the reel R, a stationary blade S may be used having either a straight cutting edge or an arcuate cutting edge, the arched stationary blade being adjustable in either case with respect to the reel to cause its cutting edge to correspond to the contour of the arcuate edges on the rotary blades.

Referring to the drawings, a machine for grinding arcuate edges on the blades of a lawn-mower is herein illustrated in its preferred form. The machine as shown is generally similar to that shown and described in United States Letters Patent No. 2,142,669, issued to Purdom Carpenter, January 3, 1939. Suffice it to state that the machine comprises in general a frame or base having end standards 1 and 2 held in spaced relationship by tie-rods 3, 4, 5 and 6 connected at their ends to the standards. Extending transversely of the machine in spaced apart relationship are supporting rods 9, only one being shown in Fig. 1, pivotally connected to the tie-rod 4 at their rearward ends and to jack-screws 10 at their forward ends. The jack-screws 10 are so constructed and arranged as to adapt the forward ends of the rods 9 to be raised or lowered when the screws are turned. Mounted on the rods 9 are blocks 11 adapted to be moved forwardly and rearwardly longitudinally thereof by means of adjusting screws 12. The blocks 11 support a shaft 13 extending transversely of the rods 9 and mounted to rock on the shaft is a work-supporting cradle as next described.

The cradle comprises V-shaped members or arms 16 pivotally mounted in spaced relationship on the shaft 13 and an angle-iron rail or bed 17 connecting the ends of the rearward arms 18 of the V-shaped members 16, see Fig. 3. A head-stock 19 and tail-stock 20 are mounted on the rail or bed 17 for adjustment therealong. The head-stock 19 has a dead center 21 while the tail-stock 20 has a center 22 formed at one end of a screw 23. A handle 24 at the opposite end of the screw 23 adapts the latter to be rotated to adjust the center 22 at its opposite end. As illustrated in Fig. 3, the stationary blade S is adapted to be mounted between the centers 21 and 22 and is supported centrally on one side by means of a bracket 25 adjustably mounted on the rail or bed 17 and having an adjustable screw 26 engageable with the blade.

The opposite arms 30 of the V-shaped members 16 have notches 31 at their upper ends for receiving the tie-rod 32 of a lawn-mower frame and a clamp 33 for clamping the tie-rod in the notch, see Fig. 1. An adjustable bracket 34 extending upwardly from the machine frame tie-rod 3 is adapted to support the roller 35 of the lawn-mower to locate the rotary blades r in position to be ground. The cradle is rockable from one to the other of the two positions illustrated in Figs. 1 and 3. As illustrated in Fig. 1, the arms 18 and 30 of the cradle have notches 36 and 37, respectively, for receiving the shank of a thumb-screw 38 screwed into the block 11 on the rod 9 to clamp the cradle in different positions on the frame. It will be understood that other fixtures may be provided for supporting the stationary blade S and reel R, either mounted in or detached from the mower, in position to be traversed by the grinding wheel.

The grinding means comprises an abrasive wheel 40 adapted to traverse the blade S or blades r to be ground. The grinding wheel 40 is mounted for rotation on a shaft 41 at one side of a carriage 42 in the form of a lever and is driven from an electric motor 43 on the carriage by a belt 44. The carriage 42 has depending bearings which embrace the tie-rod 5 to mount the carriage to rock and slide thereon. Thus, the tie-rod 5 constitutes a track for guiding and supporting the carriage 42. The grinding wheel 40 and motor 43 are preferably arranged on the carriage or lever 42 on opposite sides of the track 5 to counterbalance each other with a slight overbalance on the wheel side. The rocking movement of the carriage 42 on its supporting track 5 is controlled by an adjustable linkage connecting the carriage to the frame tie-rod 6 which constitutes a guiding track therefor. The linkage comprises a guard 45 for the wheel 40 attached to the shaft 41 and an adjusting rod 46 connecting the guard to a bearing 47 slidable on the guiding track 6. As illustrated in Fig. 1, the upper end of the rod 46 is clamped in the bearing 47 by means of thumb-screws 48 to permit its vertical adjustment and the lower end of the rod has screw-threads 49 which cooperate with the threaded bore of a nut 50 closely fitting between the sides of a slot 51 in a bearing 52 surmounting the guard 45. Thus the linkage provides a rigid connection between the carriage 42 and the bearing 47 on the guiding track 6. The bearing 47 has spaced hubs embracing the guiding track 6 and is adapted to slide thereon as the carriage is moved along its supporting track 5. Depending from the guard 45 is an adjustable finger or guide 53 for engaging the blade to be ground to hold it against the face of the abrasive wheel 40.

The carriage 42 is traversed longitudinally of the machine by means of a flexible cable 54, see Fig. 3, passing around pulleys 55 and 56 journaled on the end standards 1 and 2 of the frame with its ends connected to the opposite sides of the carriage. A crank-handle 57 is attached to one of the pulleys 56 and by rotating the handle the flexible cable 54 is traversed by the pulley 56 causing the carriage to move along its supporting track 5. As thus far described the machine is substantially identical with that shown and described in the United States Letters Patent to Purdom Carpenter referred to above.

In accordance with the present invention the guiding track 6 is arched or curved between its ends to cause the abrasive wheel 40 to move through an arcuate path as it traverses the blade S or r being ground. In the embodiment of the invention illustrated in Fig. 3 the guiding track 6 has an arc or curvature initially formed or set therein and its reduced ends 60 are held in bearings in the end standards 1 and 2 of the machine frame. With this form of construction the guiding track 6 is clamped in position in the frame standards 1 and 2 by means of set-screws 61. By loosening the set-screws 61 and turning the track 6 on its reduced ends 60 through an arc of 90° the effective curvature or arch of the track in a vertical plane may be varied from maximum to zero. To this end the guiding track 6 has longitudinal calibrations 64, see Fig. 4, adjacent one end which cooperate with a fixed pointer 65 on the frame standard 2 to indicate the degree of arch at any particular point of adjustment. It will be understood that the arch or curvature of the guiding track 6 and edges of the blades S and r is greatly exaggerated in the drawings for clearness of illustration. Actually, the maximum difference between the arcuate cutting edge on a sixteen inch blade and a straight line or chord from one end to the other of the blade rarely exceeds eight thousandths of an inch.

In Fig. 5 a modified form of arched guiding rod 70 is illustrated. The rod 70 has reduced ends 71 turned on center lines angularly related to the axis of the rod; that is to say the axes of the ends are at an angle to the main axis of the rod. The reduced ends 71 are held in bearings 72 in the end standards 1 and 2 of the machine frame and have axial threaded holes 73. Screws 74 are threaded into the holes 73 to engage their heads with the outer ends of the bearings 72, washers 75 being applied between the screw heads and the end of the bearings as shown in Fig. 5. When the screws 74 are tightened they draw the annular shoulders 76 between the main portion of the rod 70 and its reduced ends 71 against the inside faces of the bearings 72, and due to the angular relation of the shoulders to the axis of the rod the rod is caused to arch between its ends. Thus in this modified form of construction the rod 70 may be arched by merely clamping it in position in the frame. The guiding rod 70 may be turned in the same manner as the previously-described rod 6 to adjust the effective radius of the arch in a vertical plane. It will be understood that the guiding rod 70 may be initially arched in the same way as the rod 6 and the offset reduced ends 71 will oppose any forces tending to warp or straighten its curvature.

In Fig. 6 a further modified form of arched guiding rod 80 is illustrated. The guiding rod 80 has reduced ends 81 but a portion of the main rod itself is held in the bearings 82. Set-screws 83 extending through the bearings 82 engage the main portion of the guide rod 80 in the bearings and other set-screws 84 extending through the bearings 82 outwardly from the set-screws 83 engage the reduced ends 81 of the guiding rod. By tightening the set-screws 84 the guiding rod 80 may be stressed to cause it to arch between its end to any desired radius within predetermined limits.

The machine having now been described in detail its mode of operation is explained as follows: The length of the blade and type of mower to be reconditioned are first identified to determine the arch to be expected in the stationary blade. The guiding track or rod 6, 70 or 80 is then adjusted to cause the grinding wheel 40 to move through an arcuate path of a radius equal to the radius of the arch or curvature of the edge of the stationary blade S when the latter is clamped in position in the mower. The cradle is then rocked to the position illustrated in Fig. 1 and the mower mounted thereon. The cradle is adjusted by turning the jack-screw 10 and adjusting screw 12 and the position of the wheel 40 is adjusted by loosening the thumb-screws 48 and raising or lowering the rod 46 with respect to the bearing 47 to locate the reel blades r in proper position to be engaged by the grinding wheel 40, after which the thumb-screws are tightened again. The crank-handle 57 is then turned and through the pulleys 55 and 56 and flexible cable 54 the carriage or lever 42 is moved along the supporting track 5 to traverse the grinding wheel 40 along the cutting edge of the rotary blade r to be ground. As the carriage 42 is slid along its supporting track 5 the bearing 47 slides along the guiding track or rod 6, 70 or 80 and, due to the arch in the latter and the rigid connecting linkage between the bearing 47 and the carriage 42, the wheel 40 is moved through an arcuate path as it traverses the blade r. Consequently, an arcuate cutting edge will be ground on the blade r. The wheel 40 is fed toward the edge of the blade r by turning the nut 50 in the connecting linkage between the bearing 47 and carriage 42 to cause a deeper cut to be taken on the blade. Each of the reel blades r on the reel R are in turn traversed by the grinding wheel 40 and due to the rotation of the reel about its axis the cutting edges on all of the blades will be concentric thereto.

The stationary blade S may be mounted between the centers 21 and 22 on the rail or bed 17 of the cradle and the latter rocked to the position illustrated in Fig. 2 to locate its cutting edge in position to be operated upon by the grinding wheel 40. The wheel 40 is then traversed along the blade S in the manner explained above to grind an arcuate cutting edge on the blade.

The stationary blade S is assembled in cooperative relation to the reel R by inserting the pins or screws P through the sides of the mower and into the ends of the blade. The blade S is then adjusted by tightening one or the other of the set-screws s at each end of the blade to bring its cutting edge closely adjacent the cutting edges of the rotary blades r on the reel R as shown in Fig. 7. Before the set-screws s are tightened the cutting edges of the blades S and r have the relationship illustrated in Fig. 8; that is to say, the cutting edge of the blade r is arcuate while the cutting edge of the blade S is straight in the plane of the blade r. When the set-screws s are tightened, however, to clamp the blade S in place in the mower the blade arches between its ends and assumes a contour corresponding to the arcuate edge on the reel blades r as illustrated in Fig. 9. As the radius of the arcuate cutting edges of the blades r is the same as the radius of the arch in the blade S their cutting edges align throughout their length. As illustrated in Figs. 10 and 11 the central portion of the blades S and r shear first due to the arcuate cutting edges and the shearing is progressive to the outer ends of the blades. It will be understood that in the actual mowers the rotary blades r are helically disposed with respect to the axis of the reel R so that they shear progressively from one end to the other in the usual manner. As illustrated in Fig. 12, concentric arcs drawn through the central portion and end of the rotary blade R engage corresponding points on the cutting edge of the stationary blade S.

It will be observed from the foregoing that the present invention provides for accurately aligning the rotary and stationary blades of a lawn-mower throughout their length. It will also be observed that the invention provides for grinding arcuate cutting edges on the rotary blades to compensate for the arch occurring in the stationary blade when the latter is clamped in position in the mower.

While the method of grinding the mower blades and several forms of apparatus for carrying out the method are herein shown and described, it will be understood that various other modifications may be made in the steps of the method and the structure and arrangement of the parts of the apparatus without departing from the spirit or scope of the invention. Therefore, without limiting myself in this respect, I claim:

1. In a lawn-mower grinding machine, means for mounting the blade to be ground, a guiding track extending longitudinally with respect to the blade to be ground and having a curvature between its ends bowing outwardly away from the cutting edge of the blade, a carriage slidably mounted to be guided by said track, a grinding wheel journaled on the carriage and adapted to traverse the cutting edge of the blade as the carriage is slid along the track, said track being adjustable through an arc of 90° to vary the effective radius of its arch with respect to the cutting edge of the blade to be ground, and means for indicating the relative position of the track.

2. In a lawn-mower grinding machine, a frame having bearings at its ends, means on the frame for mounting the blade to be ground, a guiding track extending longitudinally with respect to the blade to be ground and having reduced ends extending into the bearings in the frame, said guiding track having annular shoulders extending at an angle to the axis of the track, means for clamping the annular shoulders on the track against the ends of the bearings to arch the track between its ends, a carriage mounted to move on the frame, and a rotary grinding wheel mounted on the carriage for traversing the cutting edge of the blade as the carriage is moved on the frame and guided by said track, said arched track guiding the wheel to cause it to move through an arcuate path to grind an arcuate cutting edge on the blade.

3. In a lawn-mower sharpener, a base, a track supported by the base, means under the control of an operator for bowing the track adjustably, a lever, means for mounting the lever on the track for vertical tilting movement transversely of the track and for movement lengthwise of the track, a sharpening element carried by the lever, a guide carried by the lever and movable with the lever along a lawn mower blade to be ground, and means for holding the lever in such position that the sharpening element will cooperate with the blade to be sharpened.

4. A lawn-mower sharpener constructed as set forth in claim 3, and wherein the sharpening element is a wheel journaled on the lever, and means for mounting the guide on the lever for adjustment circumferentially of the wheel, to alter the bevel formed on the blade by the wheel.

5. A lawn-mower sharpener, constructed as set forth in claim 3, and wherein the sharpening element is a wheel journaled on the lever, a motor carried by the lever, a driving connection between the motor and the wheel, and means for mounting the guide on the lever for adjustment circumferentially of the wheel, to alter the bevel formed on the blade by the wheel.

6. In a lawn-mower grinding machine, a frame having bearings at its ends, a work-support on the frame having means for mounting either the stationary or rotary reel blades of a lawn-mower in position to be ground, a guiding track extending longitudinally with respect to the blade to be ground with its ends extending into the bearings at the ends of the frame, said guiding track having reduced terminal portions held in said bearings, adjustable screws in the frame engageable with one side of the reduced terminal portions of the guiding track in the bearings to produce a bending effect throughout the length of the guiding track to arch the latter between its ends, a carriage mounted to move on the frame, a rotating grinding wheel mounted on the carriage for traversing the cutting edge of the blade as the carriage is moved on the frame and guided by said track, said arched track guiding the wheel to move through an arcuate path to grind an arcuate cutting edge on the blade.

7. In a lawn-mower grinding machine, a frame having bearings at its ends, means on the frame for mounting the blade to be ground, a guiding track extending longitudinally with respect to the blade to be ground and having reduced ends extending into the bearings at the ends of the frame, a carriage mounted to slide on the frame to be guided by the track, a rotary grinding wheel mounted on the carriage for traversing the cutting edge of the blade as the carriage is slid on the frame and guided by said track, and means for clamping the reduced ends of the guiding track in the bearings in the frame, said last-named means cooperating with the bearings and reduced ends of the guiding track to produce a bending effect throughout the length of the guiding track to arch the latter to cause the grinding wheel to move through an arcuate path to grind an arcuate cutting edge on the blade.

JOEL P. MAYNARD.